United States Patent [19]

Lee et al.

[11] 3,941,622

[45] Mar. 2, 1976

[54] COATINGS FOR FERROUS SUBSTRATES

[75] Inventors: Leonard S. Lee, Daly City; Yoshio Uyeda, San Mateo; Samuel W. Sopp, Foster City, all of Calif.

[73] Assignee: Merck & Co., Inc., Rahway, N.J.

[22] Filed: Apr. 21, 1975

[21] Appl. No.: 570,291

Related U.S. Application Data

[60] Division of Ser. No. 512,562, Oct. 7, 1974, which is a continuation-in-part of Ser. No. 486,790, July 9, 1974, abandoned, which is a continuation of Ser. No. 267,276, June 29, 1972, abandoned, which is a continuation-in-part of Ser. No. 195,010, Nov. 2, 1971, abandoned.

[52] U.S. Cl. ........................ 148/27; 106/58; 148/6; 148/113

[51] Int. Cl.[2] .................... B23K 35/24; C04B 35/04

[58] Field of Search ............ 106/58; 148/6, 27, 113

[56] References Cited

UNITED STATES PATENTS

| | | | |
|---|---|---|---|
| 3,151,000 | 9/1964 | Schmidt et al. | 148/113 X |
| 3,215,601 | 11/1965 | Stolar | 423/331 X |
| 3,562,029 | 2/1971 | Goglio et al. | 148/113 |
| 3,583,919 | 6/1971 | Balint et al. | 106/58 |
| 3,765,957 | 10/1973 | Hamachi et al. | 148/113 |

*Primary Examiner*—Winston A. Douglas
*Assistant Examiner*—William G. Wright
*Attorney, Agent, or Firm*—Hesna J. Pfeiffer; Julian S. Levitt

[57] ABSTRACT

Novel amorphous magnesia-silica complexes containing from about 0.001 to 2.0 percent by weight of an alkali metal oxide, wherein the mole ratio of MgO:-$SiO_2$ of said complexes is from about 1:25 to 14:1.

6 Claims, No Drawings

COATINGS FOR FERROUS SUBSTRATES

This is a division of application Ser. No. 512,562, filed Oct. 7, 1974, which in turn is a continuation-in-part of U.S. Pat. Ser. No. 486,790, filed July 9, 1974, now abandoned, which in turn is a continuation of U.S. Pat. Ser. No. 267,276, filed June 29, 1972, now abandoned, which in turn is a continuation-in-part of U.S. Pat. Ser. No. 195,010, filed Nov. 2, 1971, now abandoned.

This invention relates to novel amorphous magnesia-silica complexes containing from about 0.001 to 2.0 percent by weight of an alkali metal oxide, the mole ratio of $MgO:SiO_2$ of said complex being from about 1:25 to 14:1. The invention further relates to the use of said complexes as coatings for grain oriented silicon steel. The invention further relates to employing the amorphous magnesia-silica complex as an additive for magnesium oxide/magnesium hydroxide coatings for ferrous substrates.

In many fields of use and, in particular, in the electrical industry, it is necessary to provide a coating on ferrous material. This coating desirably performs the function of separating and purifying the ferrous material and reacting with surface silica in the steel to form an electrical insulating layer. For example, in the transformer art, the cores of the transformers are usually formed of a ferrous material, such as silicon steel, which may be provided with a preferred grain growth orientation to provide optimum electrical and magnetic properties. It has been found necessary to provide a coating on the ferrous material prior to the final high temperature grain growth anneal. This coating will perform three separate functions. The first function of the coating is to provide separation of the various turns or layers of the coiled material to prevent their sticking or welding together during high temperature anneals. A second function is that of aiding in the chemical purification of the ferrous material to develop the desired optimum magnetic characteristics of such material. The third function of the coating is to form on the surface of the ferrous material a refractory type coating which will provide electrical insulation of one layer of ferrous material from the next during its use as a core in a transformer or in other electrical apparatus such as motor armatures or the like.

In the present state of the electrical apparatus art, the most widely used coating for the ferrous material which is used as the magnetic core of the electrical apparatus is a coating of magnesium oxide and/or magnesium hydroxide. These coatings are, in general, applied to the ferrous material in the form of a suspension of magnesium oxide and/or magnesium hydroxide in water. The suspension comprises a quantity of magnesium oxide in water and is mixed sufficiently for the desired application; the magnesium oxide being hydrated to an extent dependent on the character of the oxide used, the duration of mixing and the temperature of the suspension. Therefore, the term magnesium oxide coating is with reference to a coating of magnesium hydroxide which may include magnesium oxide which has not been hydrated.

As set forth in U.S. Pat. No. 2,385,332, in the names of Victor W. Carpenter et al., during a heat treatment at suitable temperatures, magnesium oxide can be caused to react with silica particles on or near the surfaces of previously oxidized silicon-iron sheet stock to form a glass-like coating, which coating is useful as an interlaminary insulator in the use of silicon-iron in electrical apparatus, e.g., in the cores of transformers.

In the production of silicon steel for the magnetic cores of transformers, the steel is generally annealed to provide optimum grain growth and grain orientation which develops the magnetic properties of the silicon steel. This anneal is usually carried out in a hydrogen atmosphere at temperatures ranging from approximately 950° to 1500°C. from about 2 to about 50 hours. This anneal also aids in purifying the steel, aided by the coating placed on the steel. During this anneal a portion of the magnesium oxide coating reacts with the silica on the surface of the silicon steel to form a glass-like coating of magnesium silicate. This glass-like coating provides electrical insulation during the use of the silicon steel in electrical apparatus, e.g., in the cores of transformers.

A number of additives have been proposed in the past to be added to the magnesium hydroxide and/or magnesium oxide in order to improve the $MgO-SiO_2$ reaction. For example, U.S. Pat. No. 2,809,137 (Robinson) involves the use of silica to be combined with the MgO for the purpose of improving the insulating properties of the glass-like film obtained after high temperature annealing. U.S. Pat. No. 2,394,047 (Elsey, et al) relates to the use of additives to produce oxidized surface metal and to enhance glass film formation. In addition to the above, the following U.S. Patents are directed to various materials including silicas and silicates which have been proposed as additives for the coating of ferrous materials. U.S. Pat. Nos. 3,583,887; 3,214,302; 3,562,029; 2,739,085; and 2,354,123.

In addition to utilizing the amorphous magnesia-silica complexes per se as coatings for silicon steel, these novel materials may be employed as additives for conventional MgO coatings. Accordingly, this invention further relates to coatings containing magnesium oxide/magnesium hydroxide and at least one amorphous magnesia-silica complex which when applied to silicon sheet steel impart superior insulation qualities to the silicon steel after the final high temperature anneal in addition to serving as a separator coating for the sheet material during heat treatment and aiding in the purification of the magnetic material.

The novel amorphous magnesia-silica complexes of the invention include those materials wherein the mole ratio expressed as $MgO:SiO_2$ may vary from about 1:25 to 14:1. The complexes of the invention contain from about 0.001 to 2.0 percent by weight of an alkali metal oxide. Representative of the alkali metals that may be employed in the practice of the invention are sodium, lithium, potassium and the like. Of particular preference are the amorphous (i.e., non-crystalline) magnesia-silica complexes having a molar ratio of $MgO:SiO_2$ of from about 1:13 to 7:1 and from about 0.01 to 1.0 percent by weight of alkali metal. An example of a complex that has highly desirable properties is one having a $MgO:SiO_2$ molar ratio of 1:1.6 and from 0.05 to 0.4% by weight of sodium oxide. Of particular interest are those complexes wherein the sodium oxide is from 0.1 to 0.2% by weight.

Insofar as the alkali metal is concerned, it should be noted that, although the alkali metal oxide is expressed throughout the specification and claims as a component of the magnesia-silica complex, one skilled in the art will readily appreciate that the alkali metal oxide may be provided from a source separate from the magnesia-silica complex. Accordingly, where the complex is employed as the sole coating agent, the appropriate level of alkali metal oxide may be provided by either the complex per se or where a complex free of alkali metal oxide is utilized, any convenient source of alkali metal oxide may be employed in combination with the magnesia-silica complex to insure that the coating composition contains the appropriate level of alkali metal oxide. Included among the materials that may be used in the practice of the invention to provide the alkali metal oxide are hydroxides, carbonates and the like. Where the magnesia-silica complex is employed as an additive to be utilized in conjunction with MgO, as indicated above, the alkali metal oxide component may be included as a component of the complex or made available from either the MgO or an independent source such as the hydroxides and carbonates discussed above.

The novel magnesia-silica complexes of the invention may be conveniently prepared by the precipitation reaction between a solution of a magnesium salt such as $MgCl_2$, $MgSO_4$ or $Mg(NO_3)_2$ and a solution of silicate salt such as an alkali metal silicate (e.g., sodium silicate, or potassium silicate). The alkali metal silicates that may be employed as reactants include those wherein the mole ratio of alkali metal (M) to silicate is 1:25 to 14:1 expressed as $M_2O:SiO_2$.

As indicated previously, amorphous magnesia-silica complexes which do not contain the alkali metal oxide may be employed in the practice of the invention if the alkali metal oxide is provided from another source. In such cases, other soluble silicate salts may be employed in the preparation of the amorphous magnesia-silica complex. The conditions under which the precipitation reaction occurs are not critical and involve techniques well known to the art. For example, an amorphous, magnesia-silica complex having a mole ratio of 1:2 with respect to $MgO:SiO_2$ may be prepared by a precipitation process employing an alkali metal silicate having a mole ratio of 1:2 with respect to the $M_2O:SiO_2$ in the presence of excess magnesium salt.

In addition to the above, other procedures that may be employed in the preparation of the novel magnesia-silica complexes of the invention are as follows:

1. Magnesia is precipitated by reacting $MgCl_2$ or $MgSO_4$ with NaOH or dolomite or $Ca(OH)_2$ to form $Mg(OH)_2$.
2. Silica is prepared by acidifying sodium silicate or any alkaline silicates.
3. The two slurries are combined in a wet state to afford an intimate mix, filter off the impurities by washing, extraction.
4. The product is dried in a suitable drier.

Another convenient method of preparation is as follows:

1. Sodium hydroxide and magnesium chloride or sulfate are reacted to form $Mg(OH)_2$.
2. Mix the $Mg(OH)_2$ slurry with sodium silicate.
3. React 2 with hydrochloric acid to form the magnesia-silica complex.
4. Filter and wash off NaCl or $Na_2SO_4$ impurities.
5. The filter cake is dried in a suitable drier.

The amorphous property of the magnesia-silica complex is apparent from a consideration of the X-ray diffraction pattern of representative magnesia-silica complexes of the invention. In Table I, X-ray powder diffraction data of the magnesia-silica complexes are reported. In order to illustrate the uniqueness of the magnesia-silica complex, the X-ray powder diffraction patterns were obtained for prior art colloidal silica, MgO-colloidal silica compositions and fibrous magnesium silicate. These prior art materials have been taught for use in the coating of silicon steels.

The d-spacings and hkl planes (Miller Indices) of the materials tested are reported including an identification of the crystalline structure, where appropriate.

The X-ray diffraction studies were conducted in an X-ray diffractometer under the following conditions:

| | Formulation | X-Ray Radiation Source | Filter | Voltage | Current |
|---|---|---|---|---|---|
| a. | Magnesia-silica Complex (Example 1) | CuKα | None | 40 KV | 22MA |
| b. | Magnesia-silica Complex (Example 2) | CuKα | None | 40 KV | 22 MA |
| c. | Magnesia-silica Complex (Mole Ratio-1.7:1) | CuKα | None | 40 KV | 22 MA |
| d. | Magnesia-silica Complex (Mole Ratio-1:1.5) | CuKα | Ni | 40 KV | 20 MA |
| e. | Magnesia-silica Complex (Example 8) | CuKα | Ni | 40 KV | 20 MA |
| f. | Magnesia-silica Complex (Mole Ratio-1:1.6) | CuKα | Ni | 40 KV | 20 MA |
| g. | Colloidal Silica (LUDOX) | CuKα | Ni | 40 KV | 20 MA |
| h. | Colloidal Silica + MgO (1:1 by weight) | CuKα | Ni | 40 KV | 20 MA |
| i. | Colloidal Silica + MgO (1:4 by Weight) | CuKα | Ni | 40 KV | 20 MA |
| j. | Fibrous Magnesium Silicate | CuKα | Ni | 40 KV | 20 MA |
| k. | Fibrous Magnesium Silicate | CuKα | Ni | 40 KV | 20 MA |

The techniques used in these studies followed the commonly accepted Debye-Scherrer Method as described in Klug & Alexander's X-Ray Diffraction Procedure for Polycrystalline and Amorphous Materials (Wiley, 1954) pp. 206–209.

TABLE I

| | | d (A) | Miller Indices (hkl) | Identified Crystalline Structure |
|---|---|---|---|---|
| a. | Magnesia Silica Complex $MgO:SiO_2$ mole ratio = 1:1.6 and contains .774% $Na_2O$ (Example 1) | — | — | Amorphous |

TABLE I-continued

| | d (A) | Miller Indices (hkl) | Identified Crystalline Structure | |
|---|---|---|---|---|
| b. Magnesia Silica Complex $MgO:SiO_2$ mole ratio = 1:1.6 heated at 1000°C. for 3 minutes (Example 2) | 1.607 | 531 | Clinoenstatite | Mostly Amorphous |
| | 2.5 | 131 | Enstatite | |
| | | 202 | Clinoenstatite | |
| | 2.87 | 610 | Enstatite | |
| | | 310 | Clinoenstatite | |
| | 2.98 | 221 | Clinoenstatite | |
| | 3.17 | 420 | Enstatite | |
| | | 220 | Clinoenstatite | |
| | 3.30 | 121 | Enstatite | |
| | | 021 | Clinoenstatite | |
| c. Magnesia Silica Complex $MgO:SiO_2$ mole ratio = 1.7:1 | — | — | Amorphous | |
| d. Magnesia Silica Complex $MgO:SiO_2$ mole ratio = 1:1.5 | 3.229 | — | | |
| | 2.5902 | — | Amorphous | |
| e. Magnesia Silica Complex $MgO:SiO_2$ mole ratio = 1:1.6 and contains 0.20% $Na_2O$ (Example 8) | 2.829 | — | | |
| | 2.5902 | — | Amorphous | |
| | 1.545 | — | | |
| f. Magnesia Silica Complex $MgO:SiO_2$ mole ratio = 1:1.6 | — | — | Amorphous | |
| g. Colloidal Silica (Ludox) | 4.07 | 101 | α-cristobalite | |
| h. Colloidal Silica + MgO 1 to 1 ratio by weight | 4.776 | 001 | Magnesia | |
| | 2.728 | 100 | Magnesia | |
| | 2.366 | 101 | Magnesia | |
| | 1.792 | 102 | Magnesia | |
| | 1.574 | 110 | Magnesia | |
| | 1.493 | 111 | Magnesia | |
| | 1.373 | 103 | Magnesia | |
| | 1.310 | 201 | Magnesia | |
| i. Colloidal Silica + MgO, 1:4 ratio by weight | 4.760 | 001 | Magnesia | |
| | 2.720 | 100 | Magnesia | |
| | 2.360 | 101 | Magnesia | |
| | 1.789 | 102 | Magnesia | |
| | 1.569 | 110 | Magnesia | |
| | 1.491 | 111 | Magnesia | |
| | 1.370 | 103 | Magnesia | |
| | 1.309 | 201 | Magnesia | |
| j. Fibrous Magnesium Silicate | 4.766 | 001 | Magnesia | |
| | 4.548 | 020 | Serpentine ($3MgO.2SiO_2.2H_2O$) | |
| | 3.660 | 0.0.12 | Serpentine | |
| | 3.336 | 029 | Serpentine | |
| | 2.966 | 0.2.11 | Serpentine | |
| | 2.527 | — | — | |
| | 2.499 | 206 | Serpentine | |
| | 2.453 | 0.2.15 | Serpentine | |
| | 2.372 | 209 | Serpentine | |
| | 2.154 | 2.14.9 | Serpentine | |
| | 2.097 | 2.0.15 | Serpentine | |
| | 1.799 | 2.0.18 | Serpentine | |
| | 1.617 | 2.0.21 | Serpentine | |
| | 1.536 | 060 | Serpentine | |
| | 1.507 | 2.0.24 | Serpentine | |
| | 1.485 | 220 | Magnesia | |
| k. Fibrous Magnesium Silicate (6 layers ortho type) | 7.310 | 006 | Serpentine ($3MgO.2SiO_2.2H_2O$) | |
| | 4.766 | 001 | Magnesia | |
| | 4.570 | 020 | Serpentine | |
| | 4.227 | 024 | Serpentine | |
| | 3.660 | 0.0.12 | Serpentine | |
| | 2.506 | 206 | Serpentine | |
| | 2.372 | 209 | Serpentine | |
| | 1.796 | 2.0.18 | Serpentine | |
| | 1.538 | 060 | Serpentine | |

The colloidal silica reported in formulations (g), (h) and (i) above is commercially available under the name of "LUDOX" and is a product of E. I. du Pont de Nemours and Company and is taught as a coating material for silicon steel in U.S. Pat. No. 2,809,137. Formulation (h) was prepared according to U.S. Pat. No. 2,809,137 (Col. 3, lines 60–65). Formulation (i) was prepared according to U.S. Pat. No. 2,809,137 (Col. 3, lines 66–70).

The fibrous magnesium silicates reported in formulations (j) and (k) correspond to the fibrous magnesium silicate disclosed in U.S. Pat. No. 3,562,029 as useful in the coating of silicon steel.

The studies reported in Table I indicate that the magnesia-silica complexes of the invention are amorphous, whereas the prior art materials (colloidal silica, colloidal silica + MgO, and fibrous magnesium silicate) are crystalline in nature.

The thermal behavior of the novel magnesia-silica complexes of the invention in a Differential Thermal Analyzer (DTA) have been studied. In addition, a study of the Differential Thermal Analysis of the following prior art coating materials was conducted: commercial steel grade MgO, colloidal silica, colloidal silica + MgO, fibrous magnesium silicate, commercial steel grade MgO + fibrous magnesium silicate. Also included within the study is the DTA of a composition within the scope of the invention—commercial steel grade MgO and the novel magnesia-silica complex.

The Differential Thermal Analyses of the materials studied were conducted under the following conditions:

atmosphere:air, 760 MM
reference:alumina
heating rate:10°C./min.
starting temperature:room temperature

DIFFERENTIAL THERMAL ANALYSIS

A. The novel magnesia-silica complexes of the invention exhibit the following thermal behavior characteristics:

a. endothermic peak at about 250°C.;
b. exothermic peak at about 820°C.;
c. exothermic peak at about 980°C.

B. Commercial steel grade MgO + magnesia silica complex exhibits the characteristic endothermic and exothermic peaks of the magnesia-silica complex and an additional endothermic peak at about 500°C.

C. Commercial steel grade MgO exhibits one endothermic peak at 380°C.

D. Colloidal silica exhibits one endothermic peak at 160°C. and one exothermic peak at 1000°C.

E. Colloidal silica + MgO exhibits one endothermic peak at 500°C. and one exothermic peak at 835°C.

F. Colloidal silica + MgO exhibits one endothermic peak at 500°C. and one exothermic peak at 1000°C.

G. Fibrous magnesium silicate exhibits endothermic peaks at 435° and 720°C. and one exothermic peak at 825°C.

H. Fibrous magnesium silicate + commercial grade MgO exhibits endothermic peaks at 465° and 690°C. and one exothermic peak at 830°C.

The colloidal silica reported in formulations D, E, and F is commercially available under the name of LUDOX — a product of E. I. du Pont de Nemours and Company and is taught as a coating material for silicon steel in U.S. Pat. No. 2,809,137. Formulation E was prepared according to U.S. Pat. No. 2,809,137 (Col. 3, lines 60–65). Formulation F was prepared according to U.S. Pat. No. 2,809,137 (Col. 3, lines 66–70).

The fibrous magnesium silicates reported in formulations G and H correspond to the fibrous magnesium silicate disclosed in U.S. Pat. No. 3,562,029 as useful in the coating of silicon steel.

Although the exact endothermic and exothermic reaction temperatures of the novel magnesia-silica complex were disclosed in this application, one skilled in the art would appreciate that minor variations from these exact thermal reaction temperatures are within the scope of our invention.

The unique magnesia-silica complexes may be applied as a coating to silicon steel using techniques well known to the art. Among the well known procedures that may be employed in applying the coating include the preparation of a slurry of the magnesia-silica complex in water. Where the complex is employed in conjunction with MgO, a slurry is made containing the complex and MgO in water. The slurry may be applied in the form of a thin coating on the magnetic sheet material by any convenient, suitable means including art recognized techniques such as immersion, brushing or spraying. The wet coating thus applied is dried by suitable means. The coated silicon steel in usually wound or stacked condition, is placed in an annealing furnace. A convenient and effective coating technique involves passing a continuous strip of the material to be coated through a bath containing a suspension of the complex followed by subjecting the coated material to a drying furnace.

Where the magnesia-silica complex is employed per se in the coating preparation (not in combination with MgO), the concentration of the complex is not critical and may vary from about 1 to about 50 percent by weight of the slurry. A range of amorphous magnesia-silica complex which is particularly effective is from 2 to 20 percent by weight of the slurry. One skilled in the art will appreciate, however, that the concentration of complex will depend upon the consistency of the slurry that can be tolerated, the manner in which the slurry is to be applied, and the thickness of the final coating which can be effectively processed. Furthermore, the concentration of the magnesia-silica complex will further depend upon the particular complex of the invention that is utilized in the coating preparation.

When the amorphous magnesia-silica complex is used as an additive for, or in combination with, the $MgO/Mg(OH)_2$ coating, the concentration of complex with respect to the amount of the MgO employed in the coating (exclusive of additive) is not critical and may vary from about 2 to about 200 parts by weight per 100 parts by weight of magnesium oxide. A satisfactory concentration for most practical purposes has been found to be from about 10 to 50 parts by weight of complex per 100 parts by weight of MgO. The concentration of the magnesia-silica complex-MgO combination in the coating slurry is not critical and may vary from about 1 to about 50% by weight of the slurry. A particularly effective concentration is from 2–20% by weight of the slurry. As indicated previously the concentration of the complex in the coating composition will depend upon various factors, including the composition of the magnesia-silica complex. It should be noted that the particular grade of MgO to be utilized is not critical and any commercially available MgO may be employed in the practice of the invention.

The compositions of the invention find applicability in the coating of silicon steels, including those of high permeability that have recently become of interest, particularly in the electrical industry. Examples of steels of this type include those reported in U.S. Pat. No. 3,676,227.

Representative compositions of magnesia-silica complexes in combination with MgO that may be employed in the practice of the invention are as follows:

a. 35 parts by weight of complex having an $MgO:SiO_2$ mole ratio of 1:1.6 per 100 parts by weight of MgO.
b. 180 parts by weight of complex having an $MgO:SiO_2$ mole ratio of 7:1 per 100 parts by weight of MgO.
c. 5 parts by weight of complex having an $MgO:SiO_2$ mole ratio of 1:20 per 100 parts by weight of MgO.
d. 3 parts by weight of complex having an $MgO:SiO_2$ mole ratio of 1:25 per hundred parts by weight of MgO.

e. 200 parts by weight of complex having an MgO:-$SiO_2$ mole ratio of 12:1 per 100 parts by weight of MgO.

The amorphous magnesia-silica complex may be employed in conjunction with the $MgO/Mg(OH)_2$ coatings in accordance with procedures well known in the coating of silicon steel.

The amount of magnesia-silica complex per se or magnesia-silica complex when used in combination with MgO that is applied to the silicon steel is similar to the amounts that heretofore have been conventionally employed in coating preparations. The coating weight will vary from about 0.02 to 0.70 ounces per square foot of steel surface.

The manner and time at which the complex is combined with the magnesium oxide is not critical. For example, procedures which may be utilized include adding the amorphous magnesia-silica complex to a magnesium material, such as magnesium basic carbonate or $Mg(OH)_2$, prior to its conversion to the magnesium oxide; blending the complex with the MgO or $Mg(OH)_2$; adding the amorphous material separately during coating slurry make-up; or mixing the magnesia-silica complex in the water used for coating slurry make-up prior to the addition of the MgO powder.

The annealing of the silicon steel that has previously been coated with the coating composition of the invention may be carried out in a neutral or reducing atmosphere at temperatures ranging from approximately 950° to 1,500°C. for from about 2 to 50 hours using techniques well known to the art.

The unobvious properties of the instant invention are readily apparent when it is appreciated that commercially available steel grade magnesium oxides in current use in the grain-oriented silicon steel industry give relatively low resistances of the order of 1–4 ohm-$cm^2$ according to the Franklin Test (ASTM-A344-60T), a widely used test that is utilized in the steel industry to determine the surface insulation characteristics of refractory films. However, the identical MgO material containing the novel amorphous magnesia-silica complexes of the invention resulted in an insulation of up to 1,000 ohm-$cm^2$ by the identical Franklin test.

It may be noted that the current practice of the steel industry in its attempt to improve insulation involves using an expensive and time consuming phosphate coating after the annealing step. This is done to improve the insulation from 2–4 ohm-$cm^2$ to a minimum of about 20 ohm-$cm^2$. By using the novel magnesia-silica complexes of the invention, a cost reduction in processing silicon steel is anticipated since the phosphate coating can be eliminated or at least reduced to a more easily controlled step. Furthermore, in the use of the magnesia-silica complexes no additional equipment is needed because the handling and processing properties of the complex are identical to conventional MgO coating lines.

It should be noted that, in addition to silicon steel, materials such as nickel-iron alloys, common iron and other ferromagnetic substances may be effectively coated in accordance with the practice of the invention.

In addition, where the magnesia-silica complex is to be utilized in combination with a known refractory oxide such as MgO, one skilled in the art will readily appreciate that other refractory oxides and hydroxides such as $Al_2O_3$, $Al(OH)_3$, CaO, $Ca(OH)_2$, $TiO_2$, $MnO_2$, ZnO, BeO, $Cr_2O_3$, $SiO_2$, $ThO_2$,$ZrO_2$, FeO and the like may be employed in place of or in combination with MgO.

A representative example for the preparation of a novel magnesia-silica complex of the invention is as follows:

EXAMPLE 1

Two solutions are prepared as follows:

a. A magnesium chloride solution having a concentration of 213 grams of $MgCl_2$ per liter is prepared from $MgCl_2.6H_2O$ crystals.

b. A 12% solution of sodium silicate is prepared having a mole ratio of $Na_2O:SiO_2$ of 1:1.6.

The two solutions (a) and (b) are reacted by simultaneously pumping into a reactor vessel (1 gallon capacity) equipped with an overflow spout. The flow rate of each stream is kept at 0.5–0.8 gallons per minute (gpm) with a combined flow rate of 1–1.5 gpm. The slurry is kept at 0.4–2.1 g. $MgCl_2$/1 excess by varying the flow of $MgCl_2$ solution. The slurry after stirring for 10 hours is filtered with a leaf filter and washed with 45°C. city water, dried at 220°–250°F. for 12 hours and hammermilled to a fine powder. The resultant magnesia-silica complex has a $MgO:SiO_2$ mole ratio of 1:1.6 and contains 0.774% $Na_2O$. Chemical analysis of the complex is as follows:

| | |
|---|---|
| MgO | 25.0% |
| $SiO_2$ | 59.8% |
| Loss on ignition | 15.3% |
| NaCl | 0.066% |
| Bulk density | 0.74 g/cc |

X-ray diffraction analysis reveals that the product is completely amorphous indicating that it is a magnesia-silica complex rather than a crystalline form of MgO, silica or silicate. Differential thermal analysis followed by X-ray diffraction analysis of this material at temperatures from 20° to 1,200°C. showed a poorly defined clinoenstatite phase at about 820°C.

EXAMPLE 2

The magnesia-silica complex prepared in Example 1 is heated in a muffle furnace at 1,000°C. for 3 minutes. X-ray diffraction analysis reveals that this material is largely amorphous.

EXAMPLE 3

Two solutions are prepared as follows:

1. A magnesium chloride solution is made by dissolving 454 g. of $MgCl_2.6H_2O$ in 1000 ml. of deionized water. The concentration of this solution is 213 g. $MgCl_2$/1.
2. A sodium silicate solution is prepared having a concentration of 12% solids and a mole ratio of $Na_2O:SiO_2$ of 1.7:1.

The two solutions are reacted according to the procedure of Example 1. The excess $MgCl_2$ measured is 1.75 g $MgCl_2$/1. The resultant magnesia-silica complex has a $MgO:SiO_2$ mole ratio of 1.7:1 and 0.01% $Na_2O$. Chemical analysis of the complex shows:

| | |
|---|---|
| MgO | 42.5% |
| $SiO_2$ | 37.7% |
| Loss on Ignition | 19.8% |
| NaCl | 0.40% |
| $Na_2O$ | 0.01% |
| Bulk density | 0.31 g/cc |

EXAMPLE 4

Two solutions are prepared as follows:

1. The magnesium chloride solution used in Example 1.
2. A sodium silicate solution having a concentration of 12% solids and a mole ratio of $Na_2O:SiO_2$ of 13:1.

The two solutions are reacted according to the procedure described in Example 1. The excess $MgCl_2$ measured is 1.92 g $MgCl_2$/1. The resultant magnesia-silica complex has a $MgO:SiO_2$ mole ratio of 13:1 and 0.01% $Na_2O$. Chemical analysis of the complex shows:

| | |
|---|---|
| MgO | 63.2% |
| $SiO_2$ | 7.1% |
| Loss on Ignition | 29.7% |
| NaCl | 0.40% |
| $Na_2O$ | 0.01% |
| Bulk density | 0.35 g/cc |

EXAMPLE 5

Two solutions are prepared as follows:

1. The magnesium chloride solution used in Example 1.
2. A sodium silicate solution having a concentration of 12% solids and a mole ratio of $Na_2O:SiO_2$ of 1:2.7.

The two solutions are reacted according to the procedure described in Example 1. The excess $MgCl_2$ measured is 1.65 g $MgCl_2$/1. The resultant magnesia-silica complex has a $MgO:SiO_2$ mole ratio of 1:2.7 and 0.84% $Na_2O$. Chemical analysis of the complex shows:

| | |
|---|---|
| MgO | 16.5% |
| $SiO_2$ | 67.6% |
| Loss on Ignition | 14.9% |
| NaCl | 0.46% |
| $Na_2O$ | 0.84% |
| Bulk density | 0.26 g/cc |

EXAMPLE 6

Two solutions are prepared as follows:

1. An acidified magnesium chloride solution is prepared by adding 12.6 moles of hydrochloric acid to 1 mole of magnesium chloride. The concentration is expressed as 213 g. $MgCl_2$/1.
2. A sodium silicate solution having mole ratio of $Na_2O:SiO_2$ of 1:1.6 is prepared as described in Example 1. The concentration is 12% solids.

The two solutions are reacted according to the procedure described in Example 1. The excess $MgCl_2$ as measured is expressed as 1.07 g $MgCl_2$/1. The magnesia-silica complex after being dried and hammer-milled has a $MgO:SiO_2$ mole ratio of 1:14.2 and 0.54% $Na_2O$. Chemical analysis of the powder shows:

| | |
|---|---|
| MgO | 4.2% |
| $SiO_2$ | 89.2% |
| Loss on ignition | 6.4% |
| NaCl | 0.18% |
| $Na_2O$ | 0.54% |
| Bulk density | 0.11 g/cc |

EXAMPLE 7

Two solutions are prepared as follows:

a. Magnesium sulfate solution having a concentration of 180 g. $MgSO_4$/1 equivalent is prepared by neutralizing magnesium hydroxide with sulfuric acid.

b. A sodium silicate solution having a concentration of 9% and mole ratio, $Na_2O:SiO_2$, of 1:1.6 is prepared.

The two solutions (a) and (b) are reacted by simultaneously pumping into a reactor vessel (1 gallon capacity) equipped with an overflow spout. The flow rate of each stream is kept at 0.5–0.8 gallons per minute (gpm) with a combined flow rate of 1–1.5 gpm. The slurry is kept at 15–20 g $MgSO_4$/1 excess by varying the flow of $MgSO_4$ solution. The precipitate formed is immediately diluted 1:2 with city water and filtered on a rotary vacuum filter. A 7-minute cycle is used on the filter with slurry at the overflow level. City water at 35°C. was used for washing. The filter cake after washing is dried at 500°F. for 6–12 hours. The resulting magnesia-silica complex has a $MgO:SiO_2$ mole ratio of 1:1.6 and contains 0.10% $Na_2O$.

Chemical analysis of the complex is as follows:

| | |
|---|---|
| MgO | 25.9% |
| $SiO_2$ | 59.6% |
| Ignition loss | 11.3% |
| $Na_2O$ | 0.10% |
| $SO_4$ | 0.007% |

EXAMPLE 8

Two solutions are prepared as follows:

a. Magnesium sulfate solution having a concentration of 180 g $MgSO_4$/1 is prepared by neutralizing magnesium hydroxide with sulfuric acid.

b. A sodium silicate solution having a concentration of 9% and mole ratio, $Na_2O:SiO_2$, of 1:1.6 is prepared.

The two solutions (a) and (b) are reacted by simultaneously pumping into a reactor vessel (1 gallon capacity) equipped with an overflow spout. The flow rate of each stream is kept at 0.5–0.8 gallons per minute (gpm) with a combined flow rate of 1–1.5 gpm. The slurry is kept at 15–20 g $MgSO_4$/1 excess by varying the flow of $MgSO_4$ solution. The precipitate formed is immediately diluted 1:2 with city water and filtered on a rotary vacuum filter. A 7-minute cycle is used on the filter with slurry at the overflow level. City water at 35°C. was used for washing. The filter cake after washing is dried at 500°F. for 6–12 hours. The resulting magnesia-silica complex has a $MgO:SiO_2$ mole ratio of 1:1.6 and contains 0.20% $Na_2O$.

Chemical analysis of the complex is as follows:

| | |
|---|---|
| MgO | 25.9% |
| $SiO_2$ | 59.6% |
| Ignition loss | 11.3% |
| $Na_2O$ | 0.20% |
| $SO_4$ | 0.007% |

The unobvious and unexpected properties of the novel magnesia-silica complexes of the invention are clearly evident from a consideration of the following resistivity studies wherein the complexes of the invention are tested by themselves and in combination with commercial steel grade MgO and the insulation produced is compared with that achieved by a commercial steel grade MgO by itself.

EXAMPLE 9 a. A coating slurry is made by mixing in a Waring Blender 60 g. of a commercial steel grade MgO, 30 g. of the amorphous magnesia-silica complex prepared in Examples 1–8 and 750 ml. of deionized water. The concentration of the slurry is approximately 1 lb. of solids per gallon. The mixture is allowed to stand to stabilize the viscosity. The resulting slurry is coated onto silicon steel strips (size 3 cm. × 30.5 cm.) at a coating weight of 0.061 oz./ft.$^2$ based upon MgO and dried at 250°–270°C. The coated strips are then box-annealed in hydrogen atmosphere for 30 hours at 1,200°C.

b. For comparative purposes a coating slurry is prepared according to the procedure (a) above having a concentration of 1 lb. of solids per gallon but containing only the commercial steel grade MgO of (a). Identical steel strips are coated as in (a).

After annealing and cooling, the excess coating was scrubbed off all samples with a nylon brush and a cloth. These strips were tested for resistance on both surfaces with a Franklin tester (ASTM-A344-60T). The results are as follows:

| | | COATING MATERIAL | RESISTANCE (ohm-cm$^2$) |
|---|---|---|---|
| (I) | (a) | MgO + Magnesia-silica complex ($MgO:SiO_2$ mole ratio 1:1.6; 0.774% $Na_2O$) Example 1 | 1000 |
| | (b) | MgO | 3.8 |
| (II) | (a) | MgO + Magnesia-silica complex ($MgO:SiO_2$ mole ratio 1:1.6; 0.77% $Na_2O$) Example 2 | 1000 |
| | (b) | MgO | 4.9 |
| (III) | (a) | MgO + Magnesia-silica complex ($MgO:SiO_2$ mole ratio 1.7:1; 0.01% $Na_2O$) Example 3 | 19.8 |
| | (b) | MgO | 2.8 |
| (IV) | (a) | MgO + Magnesia-silica complex ($MgO:SiO_2$ mole ratio 13:1; 0.01% $Na_2O$) Example 4 | 25.2 |
| | (b) | MgO | 2.8 |
| (V) | (a) | MgO + Magnesia-silica complex ($MgO:SiO_2$ mole ratio 1:2.7; 0.84% $Na_2O$) - Example 5 | 537.9 |
| | (b) | MgO | 2.8 |
| (VI) | (a) | MgO + Magnesia-silica complex ($MgO:SiO_2$ mole ratio 1:14.2; 0.54% $Na_2O$) - Example 6 | 41.7 |
| | (b) | MgO | 2.8 |

The above experiment unequivocally demonstrates that magnesium oxide currently employed to coat grain-oriented silicon steel gives relatively low resistance whereas the identical MgO coating containing the novel amorphous magnesia-silica complexes results in the production of a film having a considerably higher resistance. Comparable results to that indicated above are achieved employing other representative non-crystalline magnesia-silica complexes encompassed within the scope of the invention.

The following example is illustrative of the results achieved employing solely a novel magnesia-silica complex in the coating of steel in comparison with the insulation produced by a commercial steel grade MgO.

EXAMPLE 10 a. A coating slurry is made by mixing in a Waring Blender 60 grams of an amorphous magnesia-silica complex (mole ratio $MgO:SiO_2$ — 1:1.6, containing 0.774% $Na_2O$) and 500 ml. of deionized water. The mixture is allowed to stand to stabilize the viscosity. The resulting slurry is coated onto silicon steel strips (size 3 cm. × 30.5 cm.) at a coating weight of 0.029 oz/ft$^2$ based upon MgO and dried at 250°–270°C. The coated strips are then box-annealed in hydrogen atmosphere for 30 hours at 1,200°C.

b. For comparative purposes, identical steel strips are coated as in (a) with a slurry of the same concentration as employed in (a) but which contains only commercial steel grade MgO.

After box-annealing and cooling, the excess coating was scrubbed off all samples with a nylon brush and a cloth. These strips were tested for resistance on both surfaces with a Franklin tester (ASTM-A344-60T). The results are:

| | COATING MATERIAL | RESISTANCE (ohm-cm$^2$) |
|---|---|---|
| (a) | Magnesia-silica complex ($MgO:SiO_2$ mole ratio 1:1.6; 0.774% $Na_2O$) | 15.2 |
| (b) | MgO | 4.0 |

What is claimed is:

1. A composition useful in the coating of magnetic ferrous material prior to the step of annealing said coated material comprising MgO, $Mg(OH)_2$ or mixtures thereof and at least one magnesia-silica complex wherein the mole ratio of the $MgO:SiO_2$ is from about 1:25 to 14:1, said complex containing from about 0.001 to 2.0% by weight of an alkali metal oxide, said magnesia-silica complex being amorphous as indicated by its X-ray powder diffraction pattern and exhibiting the following differential thermal behavior characteristics: an endothermic peak at about 250°C.; an exothermic peak at about 820° and at 980°C.

2. The composition of claim 1 wherein the magnesia-silica complex has a $MgO:SiO_2$ mole ratio of from about 1:13 to 7:1 and the alkali metal oxide is from about 0.01 to 1.0% by weight of the magnesia-silica complex.

3. The composition of claim 2 wherein the mole ratio of $MgO:SiO_2$ is 1:1.6 and the magnesia-silica complex contains 0.05–0.4% by weight of sodium oxide.

4. A magnesia-silica complex containing from about 0.001 to 2.0% by weight of an alkali metal oxide wherein the mole ratio of $MgO:SiO_2$ is from about 1:25 to 14:1, said magnesia-silica complex being amorphous as indicated by its X-ray powder diffraction pattern and exhibiting the following differential thermal behavior characteristics: an endothermic peak at about 250°C., an exothermic peak at about 820°C. and 980°C.

5. The complex of claim 4 having a $MgO:SiO_2$ mole ratio of from about 1:13 to 7:1 and the alkali metal oxide is from about 0.01 to 1.0% by weight of the magnesia-silica complex.

6. The complex of claim 5 wherein the mole ratio of $MgO:SiO_2$ is 1:1.6 and the magnesia-silica complex contains 0.05–0.4% by weight of sodium oxide.

* * * * *